Dec. 24, 1968  E. M. VAN ALSTYNE  3,417,942
PROJECTABLE STRUCTURE

Filed Oct. 4, 1965  5 Sheets-Sheet 1

INVENTOR.
EARL M. VAN ALSTYNE
BY Richard D. Seibel
ATTORNEY

Dec. 24, 1968     E. M. VAN ALSTYNE     3,417,942
PROJECTABLE STRUCTURE Filed Oct. 4, 1965     5 Sheets-Sheet 2

INVENTOR.
EARL M. VAN ALSTYNE
BY Richard D. Seibel
ATTORNEY

FIG. 11

INVENTOR.
EARL M. VAN ALSTYNE
BY Richard D. Seibel
ATTORNEY

United States Patent Office 3,417,942
Patented Dec. 24, 1968

3,417,942
PROJECTABLE STRUCTURE
Earl M. Van Alstyne, Garden Grove, Calif., assignor to North American Rockwell Corporation, a corporation of Delaware
Filed Oct. 4, 1965, Ser. No. 492,649
19 Claims. (Cl. 244—1)

ABSTRACT OF THE DISCLOSURE

A projectable structure including a deployment vehicle, a flexible inflatable tube stored on a drum on the vehicle, and means for inflating the tube for propelling the vehicle are described. Rollers on the vehicle pinch the tube shut and are moved along the tube upon inflation thereof. Uninflated tube is concurrently payed out from the drum. In various embodiments the storage drum also forms one of the rollers or may be separated therefrom on the vehicle. Likewise a plurality of tubes may be employed between the vehicle and the means for inflating for better rigidity and control. The means for inflating comprises a hand held control gun with a control of gas used for inflation of the tube or, when a plurality of tubes are used, differential inflation of the several tubes. Breathable gas may be employed in space rescue applications for tapping at points along the length of the tube.

---

This invention relates to a structure that can be projected over a substantial distance and in particular relates to a structure including a tube lengthened by inflation that is useful as a rescue device.

In many situations a person in jeopardy is beyond the reach of a would-be rescuer or any device projected by the rescuer. Thus, for example, it may not be possible to rescue a person having broken through ice without jeopardizing others. Similarly divers may be in an inaccessible location and require a rescue device to be projected to them.

A rescue mission of particular concern at present relates to rescue of crewmen in space who may be free from the vehicle. In many space operations astronauts will be propelled from one location to another in free flight with maneuvering units. In addition crewmen may accidently launch themselves from a space vehicle without the safeguard of a tether line. Without some means of propulsion a crewman in free flight who possesses a velocity component receding from a vehicle may have no way of returning to the vehicle. A desirable way of rescue from a stranded astronaut is to reach him with a tether to stop the recession and retrieve the astronaut. At present the only known systems for such rescue operations include mechanical systems for deploying a relatively rigid member. These are limited in the length that can be achieved with a reasonable weight. Another possible rescue system comprises a cable deployed by a small propulsion unit. Such a system is inadequate because of the lack of flexure or compression rigidity which limits the steering that can be obtained without remote controls on the propulsion unit.

In space operations it is often desirable to have a target or the like at some distance from a space vehicle so that scientific measurements can be made. It may also be desirable to project a relatively rigid member for an astronaut to follow on leaving a vehicle for some distant point. The known system for these functions are difficult and heavy and may be limited in the distance of projection.

It is therefore a broad object of this invention to provide a structure that can be projected over a substantial distance.

Thus in the practice of this invention according to a preferred embodiment there is provided a deployment vehicle that is projected from a control gun along an inflatable flexible tube. The tube is stored in the deployment vehicle and dispensed as required to extend between the deployment vehicle and the control gun which also comprises a means for inflating the tube.

The control gun in a preferred embodiment is hand held for good control of inflation rate and projection direction, and comprises a gas storage vessel, flow control and a means for steering which may comprise a means for twisting a plurality of flexible tubes or means for differentially inflating a plurality of tubes.

The deployment vehicle comprises a frame in which are mounted a pair of opposed rollers that are relatively tightly urged towards each other. The thin wall flexible tube from the control gun is passed between the two rollers and the pressure between the two rollers presses the sides of the tube together to effect a substantial closure of the tube. Addition of fluid to the tube at the end conneced to the control gun increases the pressure therein and acts upon the two rollers to effect rolling thereof progressively along the length of the tube. Extra tubing in an uninflated condition can be coiled on one of the aforementioned rollers or on an auxiliary drum until used in projection of the deployment vehicle.

In a preferred embodiment for use as a space rescue system a hand held gun is used for inflating two thin plastic tubes lying parallel to each other. These tubes extend between a pair of opposed rollers in the deployment vehicle so as to be pressed closed and the two lengths of uninflated tubing are stored on two rotatable drums that rotate in opposite directions. Inflation of the two tubes causes the rollers to roll thereby projecting the deployment vehicle holding the rollers and the tube storage drums away from the control gun. The use of two contra-rotating drums minimizes net angular momentum and the employment of two tubes gives some measure of steering to the rescue assembly.

Thus it is an object of this invention to provide an expandable structure.

It is another object of this invention to provide a portable rescue unit.

It is another object of this invention to provide for controlled inflation of a tube.

Other objects and many of the attendant advantages of this invention will be readily appreciated as the same becomes better understood by reference to the following detailed description when considered in connection with the accompanying drawings wherein.

Throughout the drawings like numerals refer to like parts.

Figure 1:
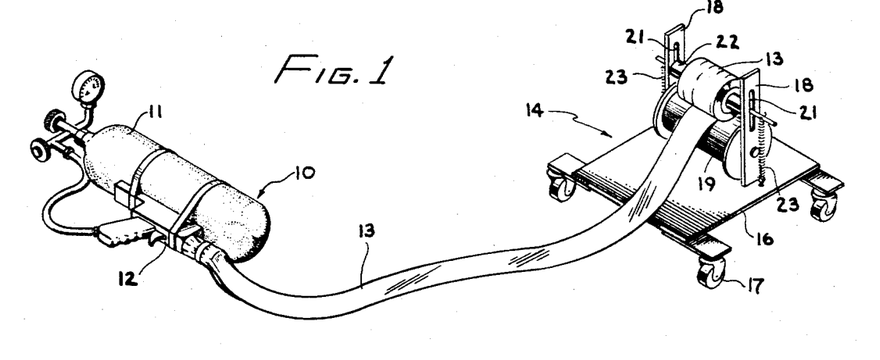
FIG. 1 illustrates a projectable assembly incorporating the principles of this invention.

FIG. 1 illustrates a projectable structure incorporating the principles of this invention. As illustrated in this embodiment there is provided a hand held control gun 10 which includes a suitably regulated gas storage cylinder 11 and a trigger operated valve 12. Connected to the control gun 10 is a flexible plastic tube 13 which is arranged to be inflated by gas from the cylinder 11 when the valve 12 is actuated. A suitable tube has been found to be a two inch diameter tube made of 0.001 inch thick plastic material such as polyethylene terephthalate available from E. I. du Pont de Nemours, Inc., under the trademark Mylar. It has also been found for certain applications tubing made of thin aluminum foil is also satisfactory. If the tube is fabricated from flat stock adhesively bonded along the length of the tube, it is preferable to bond a dummy (non-structural) strip along the opposite side of the tube to maintain weight and strength symmetry for accurate deployment. The described tube is only very slightly stretchable and is substantially rigid when inflated. If desired coloring material can be added to the tube to make it more readily visible.

Also illustrated in FIG. 1 is a deployment vehicle 14 comprising a horizontal platform 16 mounted on castors 17. Two vertical support posts 18 are mounted on the horizontal platform. Rotatably mounted between the two vertical support posts 18 above the horizontal platform 16 is a roller 19 having a horizontal axis of rotation. The vertical support posts 18 have vertical slots 21 above the roller 19, and a second roller 22 is mounted for rotational motion about a horizontal axis within said slots and also the roller 22 can move vertically in said slots 21. Springs 23 are attached on the ends of the roller 22 and the platform 16 so as to urge the roller 22 tightly towards the roller 19.

The flexible plastic tube 13 that is connected to the control gun 10 has one end secured to the roller 22 preferably by adhesive bonding and a portion of the length of the tube 13 is wrapped around the roller 22 and passes between the roller 22 and the roller 19 so as to have the sides of the tube 13 pressed together therebetween to effect a substantial closure of the tube.

In order to operate the expandable structure illustrated in FIG. 1 the valve 12 is opened thereby permitting gas to flow from the gas storage cylinder 11 into the flexible inflatable tube 13. As the tube 13 inflates a pressure is exerted on the rollers 19 and 22 on the deployment vehicle 14 thereby pushing the deployment vehicle away from the control gun 10 and causing rotation of the rollers 19 and 22 and unrolling of additional tubing 13 from the roller 22 to extend between the deployment vehicle 14 and the control gun 10 as the deployment unit is projected therefrom. Pressure on the tube 13 between the roller 22 and the roller 19 under the urging of the springs 23 substantially prevents leakage of gas through the closed portion of the tube so that the tube is inflated on the side of the rollers between the deployment vehicle and the control gun and uninflated on the side of the rollers where the tube is wrapped around the roller 22. A small amount of gas leaking between the rollers merely forms a small harmless bubble between the rollers and the tightly coiled tubing and in no way interferes with operation of the system. The seal between the walls of the tubing is sufficiently tight that very little gas passes therethrough in a ten minute period. In usual operations deployment is completed in a minute or so and the small leakage is of no consequence.

A vehicle such as illustrated in FIG. 1 is useful for projection over ice to reach a person who has broken through. By making the deployment vehicle buoyant, it can also be used for rescue where the projection is made over water.

Figure 2:
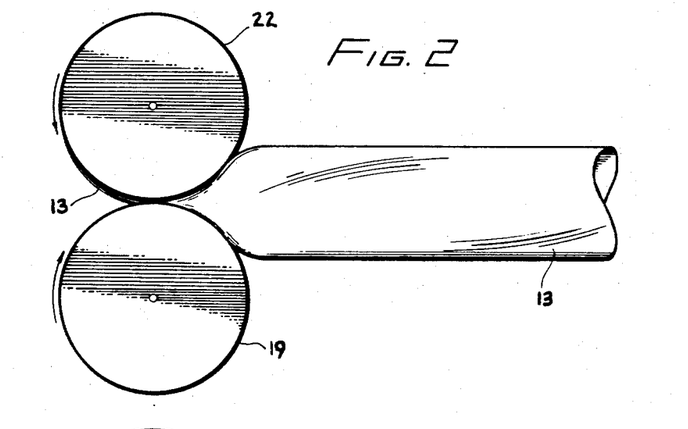
FIG. 2 illustrates schematically the deployment of an assembly comprising a single inflation tube.

The principle of operation is also illustrated in FIG. 2 wherein a pair of rollers 19 and 22 are shown schematically along with an inflatable tube 13 passing therebetween. In this figure the tube on the right side of the rollers is inflated and the tube on the left side of the rollers is uninflated. It is not material at this point whether the tube 13 is wrapped around one of the rollers as indicated or extends to some other point beyond the rollers. Pressure in the tube 13 presses the rollers 19 and 22 away from the inflated portion of the tube, thereby causing the rollers to rotate in opposite directions so that additional uninflated tubing 13 is unwound from the roller 22 annd passes between the two rollers 19 and 22 to become inflated as additional fluid is made available from the control gun 10. If no additional fluid is added to the tube 13, the pressure therein is relieved when the rollers move and additional tubing is available to contain the fluid. This reduces the force on the rollers and they are no longer caused to move away from the inflated tube when the friction of the rollers is equal to the pressure force in the tube.

Figure 3:
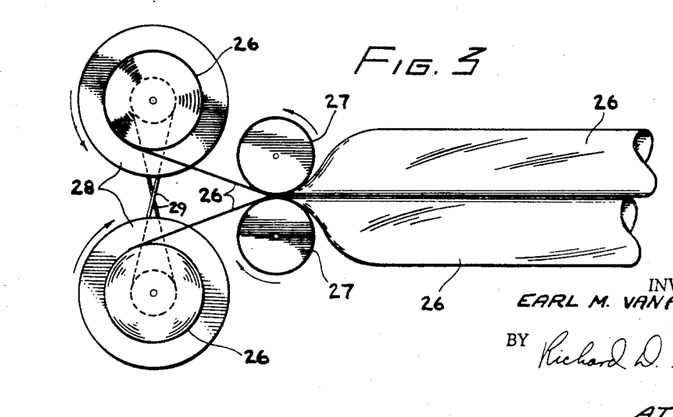
FIG. 3 illustrates schematically a deployment system incorporating two inflatable tubes.

FIG. 3 illustrates schematically a projection structure including two inflatable tubes that are substantially parallel to each other. As illustrated in this embodiment two circular cross section plastic inflatable tubes 26 of the type described above are inflated from the right side of the figure by means not illustrated in this figure. These separate tubes both pass between a single pair of opposed rollers 27 which act on the two tubes 26 so as to press the sides thereof together to effect a substantial closure of both of said tubes 26 so that fluid in the inflated portion of the tubes does not pass between the rollers into an uninflated portion of the tubes in a manner like that described above in relation to FIG. 2. After passing between the rollers 27, the two tubes 26 diverge and each of the tubes 26 is wrapped around one of a pair of storage drums or spools 28. The two tubes 26 are wrapped around the drums 28 in a direction so that one of the drums 28 rotates in a clockwise direction and the other rotates in a counter-clockwise direction upon unrolling of the tubes. By having the two drums contra-rotating, two complete balanced systems react against each other with no net moment on the deployment unit and a straight line projection is obtained without any requirement for special steering devices on the deployment unit. A tensioned crossed belt 29 interconnects the storage drums 28 so that the two drums are assured of rotating together in opposite directions, and additionally some frictional drag is obtained due to the crossed belt to inhibit free rotation of the two drums. It will be apparent that a gear interconnection of the drums could also be employed.

It is preferred to have some friction force inhibiting rotation of the drums and this can be provided by conventional spring loaded brakes as well as by the crossed belt. Without some inhibiting friction the drums would freely rotate and an excess amount of uninflated tubing would be unwound therefrom. Such tubing passing between the rollers to to side thereof having inflated tubing would tend to relieve the pressure in the tube and decrease the rigidity of the inflated tube.

The magnitude of the friction force is preferably selected so that it is equal to the force exerted by the pressure in the tubes on the rollers when the tubes are inflated at about 7 p.s.i.g. Thus at any contained pressure less than 7 p.s.i.g. the deployment unit does not move along the tubes and is not projected. This is sufficient pressure to maintain the tubes substantially rigid and gives a highly useful structure. At tube pressures higher than 7 p.s.i., the force on the rollers is greater than the friction force and the deployment unit is projected away from the control gun along the tubes as they unwind from the drums. The addition of uninflated tubing to the side of the rollers having inflated tubing tends to relieve the pressure and hence the projection force. The deployment unit will continue to move as more gas is added to the tubes, and rapidly comes to a stop when the gas flow is interrupted. With two 2 inch diameter tubes a gas flow rate of 2.17 ft.$^3$/second of gas will provide a projection velocity of 50 feet/second.

Figures 4, 5, 6:
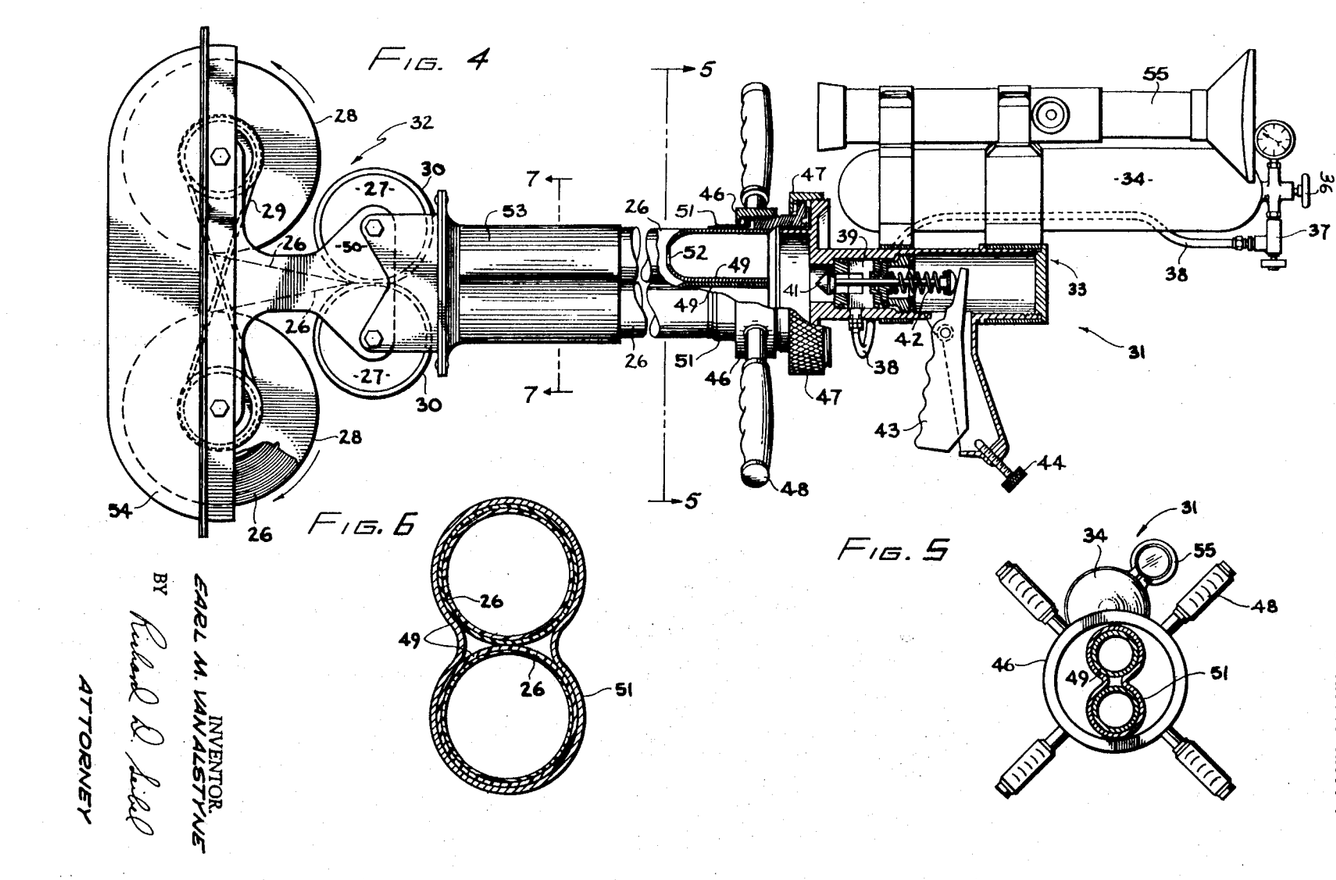
FIG. 4 illustrates in partial cutaway a portable rescue unit incorporating the principles of this invention.
FIG. 5 comprises a cross-sectional view of the control gun of FIG. 4.
FIG. 6 comprises an enlargement of a portion of FIG. 5.

FIG. 4 illustrates a portable rescue unit incorporating the principles of this invention and is particularly useful in space for reaching astronauts who are remote from a space vehicle. In this environment there is a negligible gravity effect and the weight of the deployment unit need not be independently supported. It is important, however, that the unit be dynamically balanced so that straight line projection is obtained. It will be readily apparent to one skilled in the art that a very similar unit is useful under water where the buoyancy of the deployment unit is readily adjusted so that straight line projection is obtained. In an underwater unit, it is preferred to employ water as the fluid for inflating the tubes to avoid changes in buoyancy.

As illustrated in the embodiment of FIG. 4 there is provided a hand held portable control gun 31 and a deployment unit or vehicle 32 between which two inflatable tubes 26 extend. The portable control gun 31 comprises a frame 33 on which is mounted a high pressure gas storage cylinder 34. A conventional hand operated, high pressure shutoff valve 36 is provided on the gas storage cylinder and a conventional low pressure regulator valve 37 is connected between the shutoff valve 36 and a conduit 38 leading to a low pressure gas plenum 39 within the frame 33. The gas in the storage cylinder is preferably a mixture of oxygen and nitrogen oor helium so that the gas can be used for breathing if desired.

A poppet valve 41 is provided in the frame 33 in communication with the low pressure plenum 39. A spring 42 on the poppet valve stem counteracts the gas pressure in the plenum on the poppet 41. A hand grip trigger 43 actuates the poppet to permit gas to flow from the low pressure plenum 39 for inflating the tubes 26. A screw adjust stop 44 limits the trigger motion so that excessive gas flow rates are prevented.

Mounted on the front portion of the frame 33 is a steering member 46 that is rotatable relative to the frame about an axis lying along the pointing direction of the control gun. The steering member 46 is secured to the frame by a threaded adapter nut 47. The steering member 46 is rotated relative to the frame 33 by means of hand grips 48 as hereinafter described. Two tube support cylinders 49 extend from the steering member 46 to provide an internal support for the ends of the flexible plastic tubes 26. As is more clearly illsutrated in FIGURES 5 and 6 a clamping member 51 having a substantially figure eight shape is provided over the tube support cylinders 49 and the plastic tubes 26. The figure eight shape clamping member is readily adapted to act as a spring and secure the inflatable tubes 26 to the tube support cylinders 49.

FIG. 5 is a sectional view of the control gun of FIG. 4 taken through the support cylinders 49 and FIG. 6 is an enlargement of the tube holding portion of FIG. 5 to better show the tube connection. The flexible inflatable tubes 26 preferably have a wall only about 0.001 inch thick, hence the thickness is greatly exaggerated in FIG. 6 for purposes of illustration. The thickness is not shown in FIGS. 4 and 5 but it will be understood that the single line depicting the edge of the tube indicates the presence of a tube wall about 0.001 inch thick.

Referring again to FIG. 4, the tube support cylinders 49 have apertures 52 in the ends thereof so that gas can flow into the inflatable tubes 26 that are secured thereon. Thus during operation of the control gun gas flows from the gas storage cylinder 34 through the high pressure shutoff valve 36 and the low pressure regulator valve 37 to the gas plenum 39. When the trigger 43 is pressed, the gas passes through the poppet valve 41 into the interior of the steering member 46 and through the tube support cylinders 49 to the inflatable tubes 26.

The portable control gun also includes a rifle scope 55 mounted at a convenient eye level for an operator to aid his visual resolution of a target. In most instances accurate aim of the projectable structure is more enhanced by illumination than by magnification, therefore a large light gathering objective is preferred with only a nominal magnification of a few diameters.

Figures 7, 8, 10:
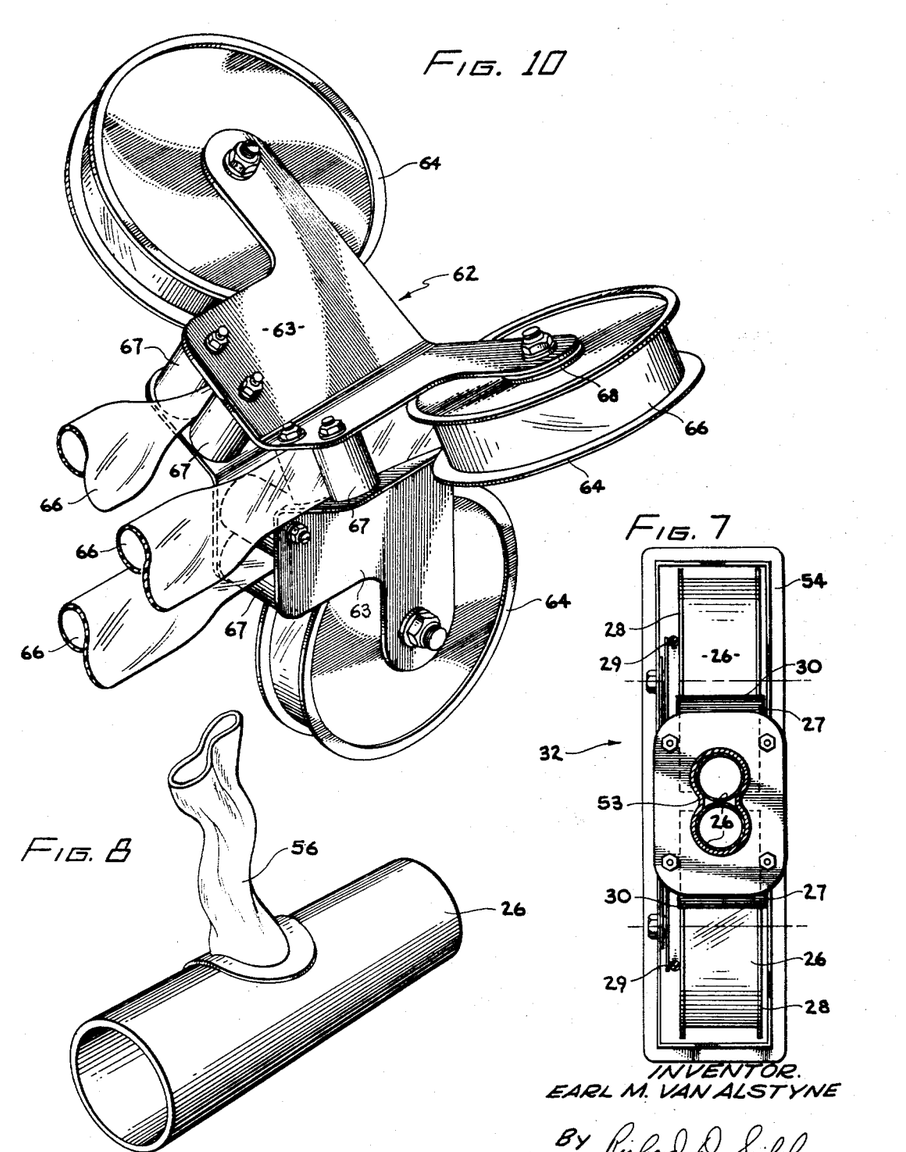
FIG. 7 comprises a sectional view of the deployment unit of FIG. 4.
FIG. 8 illustrates an appendage on an inflatable tube for pressure tapping.
FIG. 10 illustrates a deployment unit employing three inflatable tubes.

Also illustrated in FIG. 4 and in end section in FIG. 7 is a deployment unit 32. The deployment unit 32 comprises a rigid frame 50 in which are rotatably mounted a pair of rollers 27 with resilient, rubber like faces 30 between which the two tubes 26 are pressed to effect a substantial closure of both of the tubes in the manner hereinabove described. The rollers are forced together in fabrication to obtain a high pressure therebetween, deforming the faces 30 and providing closure of the tubes over an appreciable length to obtain a good seal. A tube guide 53 is mounted on the frame and projects toward the control gun so as to loosely surround a portion of the length of the two inflated tubes in a substantially figure eight pattern to provide some moment transfer between the inflated tubes 26 and the deployment unit 32. It is preferred to manufacture the tube guide from a plastic material with a low coefficient of friction such as Teflon (polytetrafluoroethylene). After passing through the tube guide 53 and between the two rollers 27 the two tubes 26 diverge and are wound on storage drums or spools 28 in a manner similar to that described in relation to FIG. 3 and shown in FIG. 4 in cutaway with exaggerated thickness of the coiled tube 26.

The ends of the tubes are preferably fastened to the drums 28 with an adhesive tape or the like so that there is very little resistance on the deployment unit when the end of the tubes is reached upon projection. This permits the deployment unit to fly off the end of the tubes and minimizes the elastic rebound that would occur at the end of deployment if the deployment unit were tightly secured to the tubes. In addition it may be desirable to incorporate an inflatable target at the end of the tubes for scientific studies. Suitable targets that are readily coiled with the plastic tubes include frames of inflatable members such as open faced tetrahedrons or frames with sheets of material that are like sails between the inflatable frame members.

A tensioned crossed drag belt 29 is provided between the two tube storage drums 28 to provide symmetry in the tube payout rate and consequently in the spin rate of the drums and rollers. A nylon V-belt drive system mounted on both ends of the storage drums 28 is preferred. The V-belts 29 serve an additional purpose by creating friction drag at the crossing of the belt and at the drum to belt contact which limits the free rotation of the drums to prevent them from paying out uninflated tubes 26 at a higher rate than projection of the deployment unit demands as hereinabove described. A protective housing 54 is preferably provided on the deployment unit 32 to minimize the possibility of damage to the tubes 26.

The storage drums 28 and wound coils of tubing thereon together with the belt drives 29 and the rollers 27 constitute two separate and exactly opposite systems in opposite motion during projection of the deployment unit. Since the systems have equal turning forces and gyroscopic effects, no force or moment resultants other than projection of the deployment unit 32 from the control gun 31 are created that are not exactly reacted by like forces or moments, therefore the deployment unit is dynamically balanced and straight line projection is assured.

The deploying coils of tubing, drums, and rollers possess a combined center of gravity which is, in a purely axial relationship, symmetrical to the force of projection applied at the roller faces 27. In the described and illustrated embodiment the center of gravity is beyond the point of application of the projection force. It will be apparent to one skilled in the art that a rearrangement of the elements of the deployment unit could be made to make the point of application of the projection force beyond the combined center of gravity, thereby making a somewhat bulkier unit with enhanced projection stability. There is no assurance in either case that the roller faces will receive an even distribution of force. The rigidizing inflatable tubes 26, therefore, must be treated for analysis purposes as being pin jointed at the rollers and the deployment as unstable. In order to counteract any unstable moments about the coils and rollers to produce a straight projection, the aforementioned contoured guide sleeve 53 is mounted over the tubes so as to extend along a region where inflation and rigidization of the tubes is complete. This provides some coupling of moment from the rigid tubes to the deployment unit and eliminates the effect of the pin joint type of coupling at the interface between the rollers and the tubes which is incapable of transmitting a moment.

In order to use the described and illustrated projectable structure in a situation where a crewman of a space vehicle needs to project a tether to a stranded astronaut or other object in space, the entire assembly is held in the hands of the operator. The rifle scope is employed to sight on the target for accurate alignment and the trigger operated valve is actuated when the aim is correct. This causes gas to flow from the control gun into the inflatable tubes, thereby causing a force to act on the deployment unit projecting it from the control gun. A continuing grip on the trigger stabilizes projection at a velocity determined by the poppet valve opening. Release of the trigger stops injection of gas into the tubes and brings projection to a stop as friction, built into the deployment unit, overcomes dropping pressure.

As the deployment unit is projected from the control gun the operator continues to sight on the target and observe the deployment unit in order to correct any aiming errors that he may detect. Two 2 inch diameter, 0.001 inch thick tube walls pressurized to 7 p.s.i. have a critical buckling moment of 22 inch pounds. Thus the operator can exert a sidewise force on the tubes up to this value without fear of buckling. The sidewise motion is slowly propogated along the tube in a long period wave and the direction of projection of the deployment unit gradually changed to more closely approach the target. For the described two inch tubes the wave is propogated along the tube at about 13.8 feet/second.

The operator can also steer the deployment unit by turning the steering member 46. The deployment unit usually deviates slightly from a straight line projection due to manufacturing variations in the unit and in the tubes and by reorienting the deployment unit to advantageously employ this deviation the operator can effect steering. The steering is accomplished by rotating the steering member 46 relative to the frame of the control gun. This causes the two tubes to twist around each other and the small torque on the tubes is propogated along their length to act on the deployment unit to cause its rotation. With the deployment unit 100 yards from the control gun, a quarter period of rotation for the described system is about three minutes.

FIG. 8 illustrates a convenient appendage to an inflatable tube for use in pressure tapping thereof. In many instances it may be desirable to supply a stranded crewman or the like with a breathable mixture of gas to sustain him until rescue. This can be provided by pressurizing the tube used for deployment with a gas that contains oxygen and is breathable. Tapping members as illustrated are preferably spaced intermittently along the length of the tube for use at any convenient range. As illustrated in FIG. 8 there is provided an inflatable tube 26 and as a T on this tube there is provided a thin flexible tubular member or appendage 56 preferably made of the same material as the tube 26 so that it is readily rolled onto a tube storage drum along with the tube 26 and does not interfere with smooth projection. The tubular member 56 is open at the free end so that a pressure connection can be made thereto.

Figure 9:
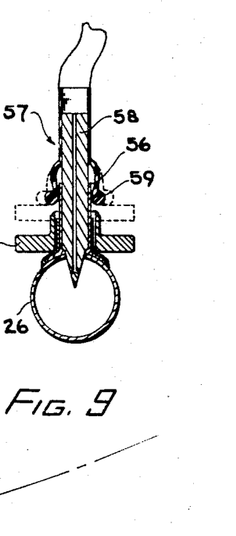
FIG. 9 illustrates an adapter for pressure tapping.

A pressure connection is made to the appendage 56 as illustrated in FIG. 9 or by other means that will be apparent to one skilled in the art. An adapter 57, hose connected to the suit of an astronaut, for example, is employed for perforating the tube 26 and securing to the appendage 56. The adapter 57 comprises a hollow core 58 with a sharp point on one end thereof for perforating the inflated tube 26. Surrounding the core is a stretchable seal 59 that is secured to the core 58 at one end of the seal and resiliently clamps against the core at the other end. A dilation member 61 is loosely fitted on the core for use in making connection to the appendage 56. In FIG. 9 the adapter is illustrated connected to the inflated tube. In order to make the connection the dilation member 61 is inserted within the seal 59 to stretch it as shown in phantom in FIG. 9. The adapter is then pressed into the inflated tube so that the point perforates the side of the tube within the appendage 56. The flow of gas from the inflated tube within the appendage causes the appendage to become relatively straight and rigid in the vacuum of space. This gas flow forces the appendage along the core 58 inside of the dilation member 61 and hence inside of the seal 59. The dilation member is then moved along the core out of the seal thereby permitting the seal to contract into its equilibrium position against the appendage and the core. The appendage is thus sealed against the core and also against the seal, however, wrinkles are normally present so that absolutely gas tight sealing is normally not obtained. It should be noted, that the use of the pressure tapping members is reserved principally for emergency situations and the slight leakage of gas is quite tolerable. The gas thereby obtained from the tube 26 by the tapping member can be employed as a breathable mixture by the stranded crewman or can be employed for thrust in an auxiliary propulsion unit.

FIG. 10 illustrates a deployment unit 62 employing three inflatable tubes 63 similar to the inflatable tubes hereinabove described. The three tube deployment unit comprises a frame 63 that is arranged to provide support for three substantially identical independent tube handling systems that are mutually angulated at 120° from each other. Each of the three tube handling systems comprises a rotatably mounted tube storage drum or spool 64 on which a tube 66 is coiled, and a pair of rollers 67 resiliently urged towards each other and between which the tube 66 is pressed to effect a substantial closure thereof. The tube on the other side of the rollers from the uninflated tubing on the storage drum is inflated in use and gas from the inflated portion is prevented from reaching the uninflated portion by the sealing action of the rollers pressing the sides of the tube together. The three tubes 66 from the three identical tube handling systems leave the deployment unit substantially parallel.

As before, for analysis purposes, the tubes can be considered to be pin jointed at the point where they pass between the rollers. However, in the three tube deployment unit the three pin jointed connections are mutually angulated at about 120° so that moment transfer from the tubes to the deployment unit can be obtained. Thus steering can be accomplished by the waving or twisting of the tubes at a control gun as hereinabove described. In addition steering can be provided by differential inflation of the three tubes. By way of illustration, consider that one of the three tubes receives more gas from a source than do the other two tubes, and hence has a higher pressure than the other two tubes. The tube with more pressure exerts a greater force on the rollers of the deployment unit than the other two tubes and the deployment unit swings in a direction responsive to this force balance. It will be apparent to one skilled in the art that the deployment unit responds in exactly the opposite manner when one of the tubes is inflated less than the other two tubes.

It will also be apparent that only a small volume of gas is required to inflate one tube more than the other two to effect a swing of the deployment unit by the small amount needed for correcting normal aiming errors. The three tube handling systems on the deployment unit 62 are independent and the rotation of the drums and rollers are not dependent on the rotation of other drums and rollers. Each drum preferably has a friction pad 68 that rubs on the frame 63 to inhibit free rotation of the drum in the same manner as the crossed belt hereinabove described. Any small differences in the friction induced by the friction pads 68 on the three drums is readily compensated for by controlled differential inflation of the three tubes.

Figure 11:
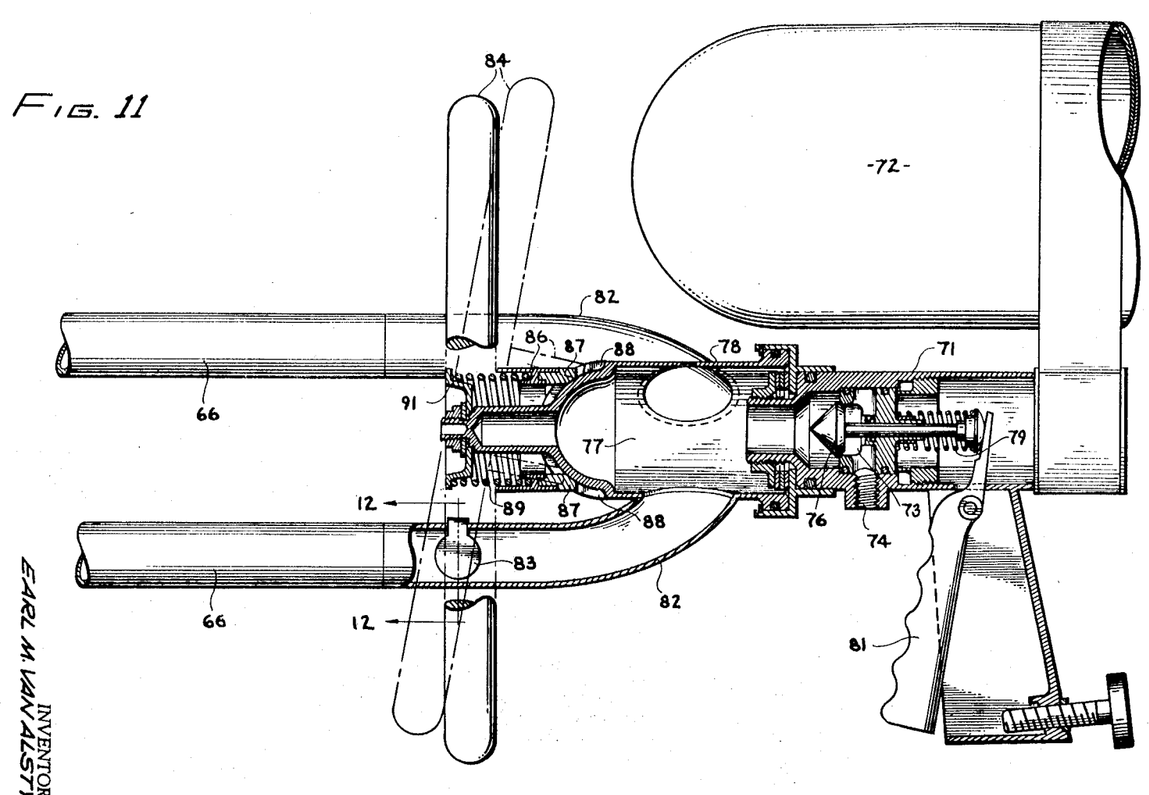
FIG. 11 illustrates a portion of a control gun for rescue unit employing three inflatable tubes.

In order to provide differential inflation of a three tube projection system, a control gun as illustrated in FIG. 11 is advantageously employed. The control gun illustrated comprises a frame 71 upon which is mounted a suitably regulated high pressure gas storage cylinder 72 similar to that previously described. Gas is conducted from the storage cylinder 72 to a gas chamber 73 through an orifice 74 in the frame by conventional tubing (not shown). Within the frame is a poppet valve 76 for controlling gas flow between the gas chamber 73 and a gas plenum 77 within a rotatable pivot hub 78 mounted on the frame 71. The poppet 76 is spring loaded against the gas pressure in the chamber 73 by a spring 79 and is actuated by a trigger grip 81 operating in substantially the same manner as the trigger actuated poppet hereinabove described.

The pivot hub 78 is mounted for rotation on the frame 71 about an axis along the pointing direction of the control gun which permits steering as in the two tube system illustrated in FIG. 4. Three tube support cylinders 82 are rigidly mounted on the pivot hub 78 in gas communication with the gas plenum 77 therein. The tube support cylinders 82 each have cemented thereon an inflatable tube 66 leading to a deployment unit 62 (FIG. 10). In each of the tube support cylinders 82 there is a butterfly valve 83 (shown schematically in FIG. 11) for controlling the gas flow to the individual tubes 66 and providing differential inflation thereof.

Pivotally mounted on the pivot hub is a handwheel 84 for control of the steering of the deployment unit. On the hub 86 of the handwheel 84 there are keys 87 that slide in tapered keyways in the pivot hub 78. This permits the handwheel to pivot on the pivot hub to a position such as shown in phantom in FIG. 11. The keys acting in the keyways, however, limit the rotation of the handwheel relative to the pivot hub about an axis along the pointing direction of the control gun. Thus when the handwheel 84 is rotated, after the backlash of the keys in the tapered keyways is passed, the pivot hub rotates on the frame and some steering of the deployment unit is obtained as previously described. A spring 89 is mounted between the hand wheel hub 86 and a spring retainer 91 rigidly secured to the pivot hub 78 for providing a restoring force on the handwheel to keep it in a symmetrical position on the pivot hub.

Figure 12:
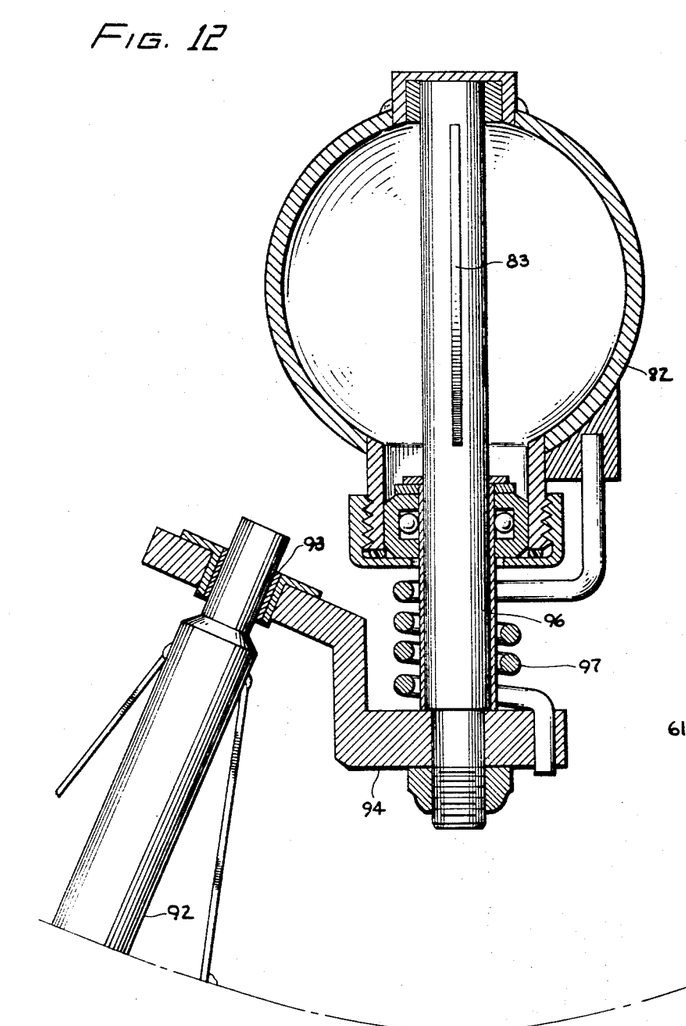
FIG. 12 illustrates in greater detail a portion of the rescue unit of FIG. 10.

The handwheel 84 is also linked to each of the butterfly valves 83 in each of the tube support cylinders 82 by a mechanical linkage for selectively actuating the butterfly valves as illustrated in FIG. 12. As illustrated therein a spoke 92 on the handwheel is passed through a bearing 93 in a bell crank 94 so as to be rotatable and slidable within the bearing. The other end of the bell crank is in turn rigidly connected to the shaft 96 of the butterfly valve 83. The shaft 96 is rotatably mounted in the tube support cylinder 82, and a spring 97 is connected between the tube support cylinder and the shaft for urging the butterfly valve into an open position.

To close a butterfly valve, the handwheel is pivoted on the pivot hub to a position such as is shown in phantom in FIG. 11. This moves the spoke 92 out of the plane of the paper in the illustration of FIG. 12 and also rotates the bell crank 94, shaft 96, and butterfly valve 83 relative to the tube support cylinder 82. The end of the spoke 92 rotates relative to the bell crank 94 and also slides in the bearing 93 to accommodate the new spatial relation between the handwheel and the tube support cylinder. Thus, for example, by pulling the handwheel toward the operator adjacent one of the bell crank connections, the corresponding butterfly valve is at least partially closed and less gas flows to the corresponding tube, thereby causing the deployment unit to be turned. The other two butterfly valves are also partially actuated by motion of the handwheel, but to a lesser extent than the one adjacent the maximum motion of the handwheel and differential inflation of the tubes is effected.

The deployment unit during projection sometimes rotates relative to the control gun along the aiming direction so that actuation of a butterfly valve may not act on the corresponding side of the deployment unit as viewed by the operator. In order to assist the operator in use of the projection system by making the control obtained correspond to the visual effect, the pivot hub 78 is rotatably mounted on the frame 71. While projecting the deployment unit the operator pulls on the handwheel at, for example, the top, and observes the direction in which the deployment unit veers from straight line deployment. The operator then rotates the handwheel so that the portion of the handwheel that was at the top is in a position corresponding to the direction of veering. After such rotation pulling on a given portion causes the deployment unit to veer slightly in that same direction. That is, for example, by pulling on the top of the handwheel the deployment unit will veer upward and by pulling on the bottom of the handwheel the deployment unit will veer downward. With a 50 foot/second projection velocity an unsealed butterfly valve gives sufficient veering to translate the deployment about two feet/second. It will be apparent to one skilled in the art that other means may be employed for differential inflation of the three tubes and hence steering of the deployment unit.

What is claimed is:

1. A projectable structure comprising:
    a drum;
    a flexible tube wound from one end thereof on the drum;
    means on the drum and movably engaging the tube for compressing the tube and restricting fluid flow therethrough; and
    means for introducing fluid into the tube from the other end thereof whereby fluid pressure tending to expand the tube at the point of its compression will cause the drum and the means on the drum to move along the tube away from said other end.

2. A projectable structure as defined in claim 1, further comprising:
    a second drum connected to said first drum;
    a second flexible tube wound from one end thereof on said second drum, said first and second tubes being wound on said first and second drums in mutually opposite directions;
    means movably engaging said second tube for compressing the tube and restricting fluid flow therethrough; and
    means for selectively and controllably introducing fluid into said second tube at a point on the tube remote from said second drum.

3. A projectable structure as defined in claim 2 wherein said means for introducing fluid into said second tube is at least partly independent of said means for introducing fluid into said first tube so that differential inflation of said first and second tubes varies the relative lengths of said tubes.

4. A controllably movable structure comprising:
    a plurality of flexible tubes;
    tube closure means mounted on the tubes intermediate the ends thereof for motion along the tubes and for compressing the tubes to restrict fluid flow therethrough; and means for introducing fluid concurrently into corresponding ends of said tubes whereby fluid pressure tending to expand the compressed tubes will cause said closure means to move along the tubes.

5. In a projectable structure including a plurality of flexible inflatable tubes, means for inflating said tubes and movable means on said tube for pressing the sides of said tubes together to effect a substantial closure thereof, said movable means including means disposed relative to said tubes so that pressure in said tubes provides a force component on said movable means for urging said movable means along the length of said tubes; the improvement comprising means for selectively inflating said tubes for varying the length of one of said tubes relative to the length of another of said tubes.

6. A projectable structure comprising:
   a plurality of flexible inflatable tubes;
   a deployment vehicle for moving along the length of said tubes including means for temporarily storing said tubes, and individual means for closing each of said tubes, said individual means for closing being mutually spaced apart; and
   means for selectively inflating said tubes for varying the amount of gas in one of said tubes relative to the amount of gas in another of said tubes.

7. A projectable structure comprising,
   a gas storage cylinder;
   a valve connected to said cylinder;
   a flexible inflatable tube having an end connected to said valve;
   a deployment vehicle;
   a first roller mounted on said vehicle;
   a second roller mounted on said vehicle;
   means for urging said second roller toward said first roller;
   said tube being wrapped around said second roller so as to pass between said first and second rollers so that inflation of said tube causes a force to act on said roller for rotation thereof whereby a portion of said tube is unwrapped from said second roller and said deployment vehicle is projected from the end of said tube connected to said valve along said tube.

8. A rescue device comprising:
   a hand held control gun;
   a steering member mounted on said control gun;
   two flexible tubes mounted on said steering member;
   means on said control gun for inflating said flexible tubes;
   a deployment vehicle on said tubes for projection from said control gun, said deployment vehicle further comprising:
      a first roller in said deployment vehicle on one side of said tubes;
      a second roller in said deployment vehicle on the other side of said tubes and urged toward said first roller so that said tubes are compressed therebetween to effect a substantial closure of said tubes to thereby separate an inflated portion of said tubes between said control gun and said deployment vehicle from an uninflated portion of said tubes adjacent said deployment vehicle;
      a first drum in said deployment vehicle having an uninflated portion of one of said tubes wrapped therearound;
      a second drum having an uninflated portion of another of said tubes wrapped therearound, said second drum being rotatable during tube unrolling in a sense opposite from said first drum during tube unrolling; and
      means interconnecting said first drum and said second drum for providing uniform rotation thereof and a frictional drag.

9. A rescue device particularly adapted for use in space where gravitational attraction can be substantially disregarded comprising:
   a control frame;
   a gas supply on said control frame;
   a gas flow control valve connected to said gas supply and communicating with a gas plenum;
   a steering member rotatably mounted on said control frame including two tube support cylinders having axes parallel to the rotation axis of said steering member and communicating with the plenum;
   two flexible inflatable tubes, one of said tubes being mounted on each of said tube support cylinders so that the inside of said tube is in gas communication with said support cylinder, each of said tubes having a length much greater than its diameter;
   a deployment frame for projection from said control frame along the length of said tubes;
   a tube guide fixed to the frame encompassing said tubes between said deployment frame and said steering member;
   a first roller on said deployment frame on one side of said tubes adjacent said tube guide;
   a second roller on said deployment frame on the other side of said tubes;
   means for urging said rollers toward each other so that said tubes are compressed therebetween to effect a substantial closure of said tubes to thereby separate one portion of said tubes between said control frame and said deployment frame from another portion of said tubes adjacent said deployment frame;
   a first drum in said deployment frame having an uninflated portion of one of said tubes wrapped therearound;
   a second drum having an uninflated portion of another of said tubes wrapped therearound, said second drum being rotatable during tube unrolling in a sense opposite from said first drum during tube unrolling; and
   a tensioned crossed belt interconnecting said first drum and said second drum for providing uniform rotation thereof and a frictional drag.

10. A rescue device particularly adapted for use in space where gravitational attraction can be substantially disregarded comprising:
   a hand held control frame;
   sighting means on the control frame for guidance of the rescue device;
   a gas storage cylinder mounted on said control frame and having gas communication with a valve chamber in said control frame;
   a hand grip operated poppet valve in said control frame for admitting gas from said valve chamber to a gas plenum;
   a steering member rotatably mounted on said control frame and forming a portion of the gas plenum;
   a hand steering grip on said steering member for rotating said steering member relative to said control frame;
   two adjacent open ended tube support cylinders on said steering member having axes parallel to the rotation axis of said steering member and in gas communication with said plenum;
   two flexible tubes, one of said tubes being mounted on each of said tube support cylinders so that the inside of each of said tubes is in gas communication with said plenum, whereby opening of said valve permits gas flow from said gas storage cylinder to inflate said flexible tubes;
   a clamping member for securing said tubes to said support cylinders;
   a deployment frame mounted on said tubes intermediate the ends thereof for projection from said control frame along said tubes under urging of a force generated by inflation of said tubes;

a first roller rotatably mounted in said deployment frame on one side of said tube;
a second roller rotatably mounted in said deployment frame on the other side of said tubes and urged toward said first roller so that both of said tubes are compressed therebetween to effect a substantial closure of said tubes to thereby separate an inflated portion of said tubes between said control frame and said deployment frame from an uninflated portion of said tubes adjacent said deployment frame;
a tube guide fixed to said control frame adjacent said rollers for guiding the inflated tubes thereto;
a first drum in said deployment frame having an end of one of said tubes sealed thereto and an uninflated portion of said tube wrapped therearound in a clockwise direction;
a second drum in said deployment frame having an end of the other of said tubes sealed thereto and an uninflated portion of said tube wrapped therearound in a counterclockwise direction; and
a tensioned crossed belt interconnecting said first and second drums for providing uniform rotation thereof and a frictional drag, whereby inflation of said tubes causes a pressure to act on said rollers to urge said rollers away from said control frame, thereby urging said deployment frame away from said control frame along the length of said tubes and causing uninflated tubes to be unwrapped from said drums to pass between said rollers.

11. A portable rescue device comprising:
a hand held control frame;
a gas storage cylinder mounted on said control frame and having gas communication with a valve chamber in said control frame;
a hand grip operated poppet valve in said control frame for admitting gas from said valve chamber to a gas plenum;
a pivot hub containing the gas plenum and rotatably mounted on said control frame;
a plurality of keyways on said pivot hub;
a plurality of tube support cylinders on said pivot hub and in gas communication with the gas plenum;
a butterfly valve in each of said tube support cylinders;
a handwheel having a hub;
a plurality of keys on the handwheel hub fitting in said keyways so that said handwheel is pivotable on said pivot hub;
a spring for urging said handwheel into a symmetrical position on said pivot hub;
a bellcrank on each of said butterfly valves;
a plurality of spokes on said handwheel, each of said spokes connected to one of said bellcranks so that one of said butterfly valves is actuated when the handwheel is pivoted on said pivot hub to an unsymmetrical position;
a plurality of flexible inflatable tubes, one of said tubes having an end mounted on each of said tube support cylinders so that the inside of said tubes is in gas communication with the gas plenum;
a deployment vehicle for moving along the length of said tubes on the outside thereof, said deployment vehicle comprising a frame and a plurality of independent mutually angulated tube handling systems, each of said systems handling one of said tubes and comprising:
    a first roller on one side of said tube;
    a second roller on the other side of said tube and urged against said first roller to effect a substantial closure of said tube to thereby separate an inflated portion of said tube between said control frame and said rollers from an uninflated portion of said tube on the other side of said rollers; and
    a rotatable storage drum having an uninflated portion of said tube coiled thereon and a friction area for rubbing contact on the frame of said deployment vehicle for inhibiting free rotation of said drum.

12. A projectable structure comprising:
a flexible inflatable tube;
means for inflating said tube at one end thereof;
a first roller on one side of said tube intermediate the ends thereof;
a second roller on the other side of said tube and urged toward said first roller so that said tube is compressed therebetween to effect a substantial closure of said tube for separating an inflated portion of said tube from an uninflated portion thereof so that pressure in said tube provides a force component on said rollers to effect rolling thereof along the length of said tube; and wherein
an uninflated portion of said tube on one side of the juncture of said rollers is wrapped around one of said rollers.

13. A projectable structure as defined in claim 1 wherein said means for compressing the tube comprises:
a housing on the drum, said drum being mounted for rotatable motion relative to said housing;
a first roller rotatably mounted on the said housing on one side of said tube;
a second roller rotatably mounted on said housing on the other side of said tube; and
means for urging said first and second rollers together with said tube therebetween.

14. A projectable structure as defined in claim 13 further comprising:
a second flexible inflatable tube also passing between said first and second rollers; and
a second drum having an uninflated portion of said second tube wrapped therearound, said second drum being rotatable in an opposite sense from said first drum upon unwrapping of said tubes.

15. A projectable structure as defined in claim 13 further comprising:
a second drum rotatably mounted on said housing;
a second flexible tube wound from one end thereof on said second drum;
third and fourth rollers rotatably mounted on said housing on opposite sides of said second tube;
means for urging said third and fourth rollers together with said second tube therebetween;
a third drum rotatably mounted on said housing;
a third flexible tube wound from one end thereof on said third drum;
fifth and sixth rollers rotatably mounted on said housing on opposite sides of said third tube;
means for urging said fifth and sixth rollers together with said third tube therebetween; and
means for introducing fluid into said second and third tubes from the other end thereof.

16. A space rescue device comprising:
a deployment vehicle;
a flexible inflatable tube connected to said deployment vehicle;
means on said deployment vehicle for effecting motion thereof upon inflation of said tube including means for paying out said tube upon inflation thereof;
means for inflating the tube with a breathable gas mixture; and
an open ended flexible tube sealed to the side of said inflatable tube as a T so that breathable gas can be tapped from said inflatable tube upon puncture of said inflatable tube.

17. A projectable structure comprising:
a flexible inflatable tube;
means for inflating said tube at one end thereof with a breathable gas;
a first roller on one side of said tube intermediate the ends thereof;

a second roller on the other side of said tube and urged toward said first roller so that said tube is compressed therebetween to effect a substantial closure of said tube and for separating an inflated portion of said tube from an uninflated portion thereof so that pressure in said tube provides a force component on said rollers to effect rolling thereof along the length of said tube; and an open ended flexible tube sealed to the side of said inflatable tube as a T so that breathable gas can be tapped from said inflatable tube upon puncture of said inflatable tube.

18. A projectable structure comprising:
a flexible inflatable tube;
means for inflating said tube;
first and second roller means mounted for rolling motion along said tube;
means for urging said roller means toward each other for closing said tube whereby as said tube is inflated said roller means are moved along said tube and the point of closure of said tube by said roller means progressively moves therewith; and
a rotatable drum mounted at a substantially fixed distance from said roller means, a portion of said tube prior to inflation being wound around said drum so that motion of said roller means along said tube upon inflation thereof unwinds said tube from said drum.

19. A projectable structure comprising:
a flexible inflatable tube;
means for inflating said tube;
first and second roller means mounted for rolling motion along said tube;
means for urging said roller means toward each other for closing said tube whereby as said tube is inflated said roller means are moved along said tube and the point of closure of said tube by the roller means progressively moves therewith; and
means for storing said tube prior to inflation wherein said tube prior to inflation is wound about one of said roller means and is unwound therefrom for deployment whereby motion of said roller means causes deployment of said tube from said roller means.

References Cited

UNITED STATES PATENTS

| | | | |
|---|---|---|---|
| 932,880 | 8/1909 | Meikle | 128—142.7 X |
| 1,272,537 | 7/1918 | Sample | 128—144 |
| 1,590,668 | 6/1926 | Bello | 128—142.7 |
| 2,851,270 | 9/1958 | Ball | 272—27 |
| 2,882,894 | 4/1959 | Famey et al. | 128—142.7 |
| 3,168,263 | 2/1965 | Kamm | 244—1 |
| 3,286,952 | 11/1966 | Seeler | 244—1 |

FOREIGN PATENTS

| | | |
|---|---|---|
| 740,453 | 11/1955 | Great Britain. |

FERGUS S. MIDDLETON, *Primary Examiner.*

U.S. Cl. X.R.

285—156, 260; 46—41; 60—57; 91—57